United States Patent [19]

Quinn et al.

[11] Patent Number: 4,600,630

[45] Date of Patent: Jul. 15, 1986

[54] METHOD FOR MAKING A PROTECTIVE COATING ON A MACHINE-READABLE MARKING AND THE PRODUCT THEREOF

[75] Inventors: Robert L. Quinn, Ewing Township, Mercer County; Philip M. Heyman, West Windsor Township, Mercer County; Abraham Goldman, South Brunswick Township, Middlesex County, all of N.J.

[73] Assignee: RCA Corporation, Princeton, N.J.

[21] Appl. No.: 536,455

[22] Filed: Sep. 28, 1983

[51] Int. Cl.[4] .................................................. B32B 3/00

[52] U.S. Cl. .................................... 428/203; 428/204; 428/210; 428/212; 428/426

[58] Field of Search ............... 428/426, 212, 210, 203, 428/204; 235/487

[56] References Cited

U.S. PATENT DOCUMENTS

| | | | |
|---|---|---|---|
| 2,837,429 | 6/1958 | Whiting | 96/35 |
| 2,992,919 | 7/1961 | Beeler et al. | 96/35 |
| 4,327,283 | 4/1982 | Heyman et al. | 235/487 |
| 4,448,827 | 5/1984 | Luijben et al. | 428/412 |
| 4,473,008 | 9/1984 | Heyman | 101/170 |

FOREIGN PATENT DOCUMENTS 627962 9/1961 Canada .

*Primary Examiner*—Edith Buffalow

*Attorney, Agent, or Firm*—Eugene M. Whitacre; Dennis H. Irlbeck; Vincent J. Coughlin, Jr.

[57] ABSTRACT

In a method of manufacturing, the steps of: providing a workpiece comprising a main body and a machine-readable marking on a portion of the body, depositing on the marking and the surrounding surface an overcoating of a liquid polymeric composition that is curable by exposure to ultraviolet radiation, and then irradiating the liquid overcoating with ultraviolet radiation so that the overcoating cures to a solid nontacky, light-transmitting protective coating. The workpiece, with the cured protective coating thereon, may be subjected to processing steps wherein extraneous matter may adhere to the coating, and then be cleaned leaving the cured coating intact.

3 Claims, 4 Drawing Figures

METHOD FOR MAKING A PROTECTIVE COATING ON A MACHINE-READABLE MARKING AND THE PRODUCT THEREOF

BACKGROUND OF THE INVENTION

This invention relates to a manufacturing method for making a protective coating on a machine-readable marking and to the product of the method. The method is particularly useful in a manufacturing method in which a machine-readable marking is produced on a glass or other nonporous workpiece.

U.S. Pat. Nos. 4,327,283 to P. M. Heyman et al. and 4,374,451 to W. R. Miller describe improved methods for assembling parts for a cathode-ray tube. The methods include providing at least one tube part, such as the glass faceplate panel, which has a unique machine-readable coded marking, such as a bar-code marking, on an external surface thereof. This marking is read one or more times by machine during the manufacture of the tube. Each time it is read, a control signal is generated in response to the reading, and then the signal is used to initiate a local process. In order for the reading to be reliable, the marking must be resonably clean at the time of each reading. Since the workpiece is subjected to various manufacturing processes, some of which involve chemicals and/or hostile environments, extraneous material which may interfere with the reading of the marking may deposit on the marking. It is, therefore, desirable to prevent such extraneous material from depositing on the marking and/or to provide a surface on the marking from which the extraneous material can be removed with an ordinary cleaning process without adversely affecting the readability of the marking.

SUMMARY OF THE INVENTION

The novel method includes the steps of providing a workpiece comprising a main body and a machine-readable marking on a portion of the body, depositing on the marking and the surrounding surface an overcoating of a polymeric composition that is curable upon exposure to ultraviolet (UV) radiation, and then irradiating the overcoating with ultraviolet radiation whereby the overcoating cures to a nontacky light-transmitting film. Subsequently, the film may be baked at elevated temperatures until the film is gasified and the marking remains machine-readable. In a preferred form of the invention, the marking is produced by depositing a thin coating of inorganic light-modulating material on the surface of the workpiece, recessing selected portions through said coating to define the machine-readable marking, and then integrating the marking into the surface of the workpiece by baking. Then, the overcoating is applied to the integrated marking as described above.

DETAILED DESCRIPTION

Figure 1:
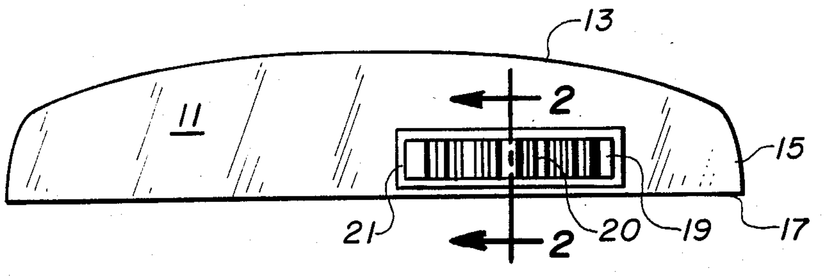
FIG. 1 is an elevational view of a glass faceplate panel for a CRT carrying a bar-code marking in the sidewall thereof and a protective coating prepared according to the novel method.
Figure 2:
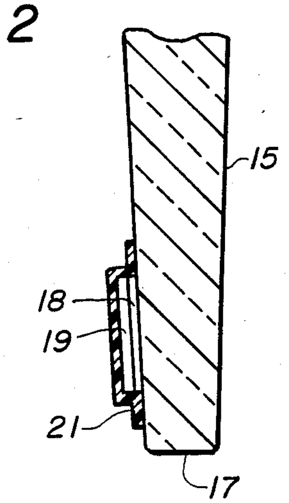
FIG. 2 is a sectional view along section lines 2—2 of a fragment of the panel shown in FIG. 1.

A typical glass faceplate panel 11 to be used as part of the envelope of a color television picture tube is shown in FIGS. 1 and 2. The panel 11 includes a rectangular viewing window 13 and an integral sidewall 15 around the window 13. The sidewall 15 has a panel seal land 17 at the distal end thereof. A thin integral panel undercoating 18 (FIG. 2) of a dark-colored light-absorbing material is located on the external side of the sidewall 15 in the area of interest. A thin integral panel coating 19 of a light-colored, light-reflecting material is located on the external side of the undercoating 18. A machine-readable coded marking 20 is recessed, e.g., abraded or ablated, through the panel coating 19 to the undercoating 18. The marking 20 comprises a related sequence of substantially-parallel bars or stripes of predetermined widths and spacings, which are referred to as a bar-code marking. Any of the codes used for a bar-code marking may be used on the panel 11. In this specific embodiment, the marking 20 uses the interleaved two-of-five code which employs bars of one-unit and three-unit widths, and spaces therebetween of one-unit and three-unit widths. Since bar codes are described in detail elsewhere, no further description of the code itself is necessary. An overcoating 21 comprising a thin light-transmitting film of UV-cured polymeric material covers the marking 20 and adjacent surfaces of the sidewall 15.

Figure 4:
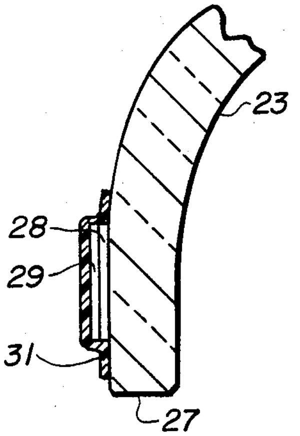
FIG. 4 is a sectional view along section lines 4—4 of a fragment of the funnel shown in FIG. 3.
Figure 3:
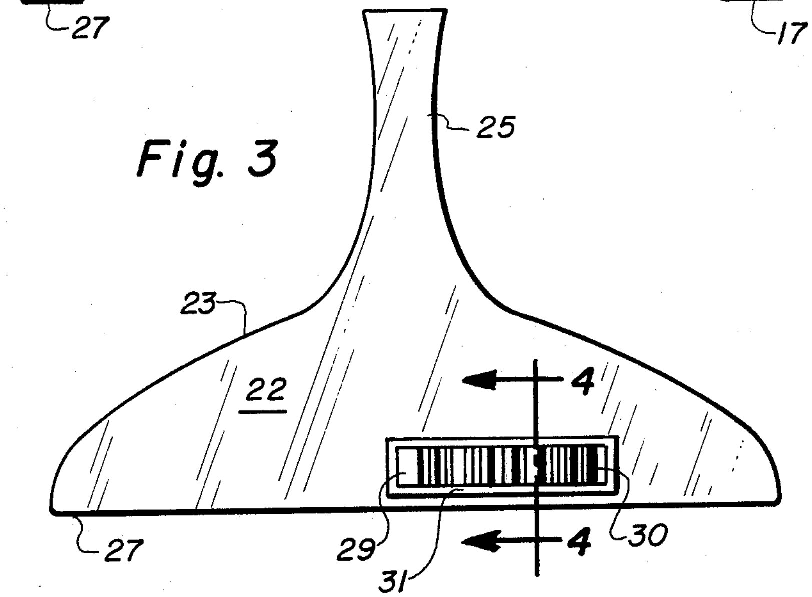
FIG. 3 is an elevational view of a glass funnel for a CRT carrying a bar-code marking in a surface thereof and a protective coating prepared according to the novel method.

A typical glass funnel 22 to be used as part of the envelope of a color television picture tube is shown in FIGS. 3 and 4. The funnel includes a cone 23, a neck 25 integral with the narrow end of the cone 23 and a funnel seal land 27 at the wide end of the cone 23. A thin integral funnel undercoating 28 of a dark-colored, light-absorbing material is located on the external surface of the cone 23 in the area of interest. A thin integral funnel coating 29 of light-colored, light-reflecting material is located on the external side of the funnel undercoating 28. A machine-readable coded marking 30 as described above for the panel 11 is recessed, e.g., abraded or ablated, through the funnel coating 29. An overcoating 31, as described above for the panel 11, covers the marking 30 and adjacent surfaces of the cone 23.

In both FIGS. 1 and 3, the coatings and the markings may be placed anywhere on the workpieces. However, for making and reading the markings automatically by machine, it is important that the markings be placed at locations that are easily located and accessed. While coded, machine-readable markings are referred to herein, the novel method may be used with any marking, coded or uncoded, machine-readable and/or human-readable.

As shown in FIG. 1, the panel marking 20 and the marks thereof are about 19 mm (0.75 inch) high and about 88.9 mm (3.50 inches) wide. The closest edge of the panel marking 20 is about 7.6 mm (0.30 inch) away from the panel seal land 17, and the bars of the marking 20 extend in a direction about normal to the surface of the seal land 17. The recessed marks, and also the spaces therebetween, are either about 0.6 mm (0.025 inch) or about 1.9 mm (0.075 inch) wide. The panel marking 20 includes a central portion with specific identifying information, typically about 68.6 mm (2.70 inches) wide, and end portions about 10.2 mm (0.40 inch) wide at each end of the central portion for signalling a machine reader the "start" and the "stop" of the marking, and for establishing a quiet zone.

The funnel marking 30 on the funnel 22, shown in FIG. 3, is similar to the above-described panel marking 20 and is located about 7.6 mm (0.30 inch) from the funnel seal land 27. During subsequent processing, the panel and the funnel may be joined together at their respective seal lands by methods known in the art. The coatings 18, 19, 28 and 29 and the markings 20 and 30 are not degraded during the common frit-sealing method which employs temperatures of more than 400° C. The undercoating 18 and 28 may be omitted in some embodiments.

Each of the undercoatings 18 and 28 and the coatings 19 and 29 consists essentially of pigment particles and a glass frit, which, after baking at elevated temperatures, becomes the permanent binder. Some suitable light-colored, light-reflecting pigments for the overcoatings are titanium dioxide, barium sulfate, zirconium dioxide, aluminum oxide and antimony oxide. Some suitable dark-colored pigments for the undercoatings are black iron oxide, manganese dioxide, ferrite #805 marketed by RCA Corporation, and refractory black pigments. The glass frit may be a particulate lead borosilicate glass or a commercial glass frit, such as #7590 marketed by Corning Glass Works, Corning, N. Y.

According to the invention, when applied, the overcoatings 21 and 31 contain as an essential ingredient, a temporary liquid organic photo-solidifiable polymeric composition. Such a polymeric composition is preferably solidifiable with ultraviolet radiation, preferably the ultraviolet light produced by a commercially-available light source. The term "ultraviolet" includes radiation having wavelengths of 4300 nanometers and shorter. Most suitable polymeric compositions include a liquid oligomer or base resin, a liquid monomer and a photoinitiator, which when irradiated with UV starts the polymerization reaction between the oligomer and the monomer. The spectral sensitivity of the photoinitiator determines the desirable wavelengths for irradiation, and therefore the selection of the light source. Commercial mercury and xenon lamps, reasonably matched to the spectral sensitivity of the polymeric composition, may be used.

The polymeric composition is liquid at room temperature and does not contain any solvent ordinarily. By "solvent" is meant an auxiliary liquid which is present in the polymeric composition and which does not combine chemically with other constituents of the liquid composition when the composition cures. A solvent, when it is present, causes tackiness in the cured coating. It can be tolerated in the uncured coating but must be removed by drying to prevent tackiness in the cured coating.

In the novel method, the oligomer or base resin is liquid, and its viscosity may be adjusted by adding suitable liquid monomers to the liquid composition. The monomers are not removed by drying during the novel method, but are chemically combined when the coating cures. In general, the base resin and the monomer for the overcoatings 21 and 31 may be chosen from any one of several chemical classes of photo-solidifiable organic compositions. The preferred organic compositions are acrylics because they are more easily and more completely removed by baking in air than other organic binders. Photoinitiators are prescribed for particular base resins. Suitable photoinitiators for acrylic base resins are benzophenone and diethoxyacetophenone (DEAP). Some suitable photo-solidifiable compositions consist essentially of commercial CMB 1700 or 1701 UV/EB Curable Resin marketed by Celanese Chemical Corp., Louisville, KY and 1 to 10 weight percent DEAP or benzophenone (photoinitiator). Other commercial compositions are the Elvacite acrylic resins marketed by Du Pont Company, Wilmington De.

The undercoatings, the coatings and the overcoatings may be applied to the glass workpiece in any one of several ways depending on the nature of the coating. Spraying and screen printing have been used successfully. Rolling may be used if the surface to be coated is not too rough. The various coatings may be applied by pad printing or other printing transfer method. The application method chosen should produce a layer that is as uniform in thickness as possible, since the clarity of the readout from the marking usually is better when the various coatings have substantially constant thickness. The undercoatings and coatings, which are typically about 12 to 25 microns (0.5 to 1.0 mil) thick, should be thick enough to have the required optical characteristics, but not so thick as to tend to crack or flake. The uncured overcoatings are about 0.25 to 1.0 mil thick. Since there is no solvent removal, the cured overcoatings have essentially the same thicknesses.

Optionally, the liquid undercoating composition is first applied to a selected surface area of the workpiece and then solidified. The liquid coating composition is then applied to the solidified undercoating and solidified. After applying the coating to the undercoating, the desired marks are recessed through the coating as by abrasion or ablation to expose the contrasting undercoating. Some suitable methods for recessing the marks into the coating are described in the above-cited patent to P. M. Heyman et al. In the preferred procedure, the recessed coating and undercoating, if present, are baked at about 300° C. or higher in air to remove organic matter and to consolidate the coating to the workpiece. Then, the overcoating is applied to the marked coating and cures to a nontacky state in less than 30 seconds, and usually less than 10 seconds, by exposure to light from a 200-watt per linear inch mercury vapor lamp or xenon lamp for 2 to 3 seconds. Overcoatings with thicknesses from 0.25 to 0.50 mil will cure in less than 10 seconds with a benzophenone concentration of about 1%. The preferred spectral range for ultraviolet-light curing is the 300 to 430 nm (nanometer) range, where most photoinitiators, such as benzophenone, absorb. Either a xenon or mercury vapor lamp may provide the necessary concentration of actinic radiation within this preferred range.

At this point, due to the presence of the overcoating, the workpiece may be processed with reasonable protection to the marking from dust, dirt, and chemical action. Where a black matrix, as of graphite, is fabricated on the inner surface of a faceplate panel, as described for example in U.S. Pat. No. 4,049,452 to E. E. Nekut, the overcoating protects the marking from chemical action of that process and also permits relatively easy removal of graphite that accidentally deposits on the overcoating. After at least part of the processing is completed, the workpiece and the overcoating may be heated in air above about 300° C. to gasify and remove the overcoating.

The undercoating, if present, and the marked coating may be heated or fired, before or after depositing the overcoating, so as to fix them to the workpiece to make them integral with the main body of the workpiece and to increase the durability of the marking. Alternatively, the undercoating, if present, and the unmarked coating may be heated or fired to make them integral with the main body of the workpiece, then the marks of the marking recessed therein, and then the marked coating overcoated. However, recessing marks into a fired coating is more difficult than recessing marks through the coating before firing. In all cases, the heating for coatings may be done by raising their temperature to about 400° to 450° C. in about 45 minutes, holding the temperature there for about 30 minutes and then cooling to about 100° C. in about 165 minutes. Any temporary organic binders in the undercoating and the coating and all of the overcoating materials are volatilized during the initial 40 minutes of the heating cycle before the inorganic binder material of the undercoating and coating cures. The holding period permits the inorganic binder material to stabilize and to consolidate the coating. The time and temperature of the heating cycle are optimized for each specific formulation. Heating or firing has the effect of integrating the undercoating and the coating into the main body. By this is meant that the coatings and the body become essentially inseparable parts of a single article, and the coatings cannot be removed from the body without destroying them. This is to be distinguished from a pigmented layer that is held to the body with an intermediate film of adhesive which can be softened or degraded and the layer released.

The combination of undercoating, if present, and coating as two integral layers produces a structure that has opposite optical characteristics (i.e., one is white and light-scattering or light-reflecting, and the other is black and light-absorbing). The parameters of the recessing system are adjusted so that the recessing is completely through the coating and just penetrates into the undercoating, which is closer to the glass body. If the layers are arranged so that the dark-colored light-absorbing layer is sandwiched between the light-colored light-reflecting layer and the glass, then the marking has the preferred optical polarity. An advantage of this arrangement is that the dark-colored undercoating optically isolates the optical reader from any interfering reflections that may arise from behind the undercoating. However, the layers can be arranged so that the light-colored layer is sandwiched between the dark-colored layer and the glass.

The panel 11 (FIG. 1) and the funnel 22 (FIG. 3) are typical workpieces comprising integral undercoating and coating. Any marked workpiece may be overcoated by the novel method. In the finished workpiece, the marking is recessed through the coating which is integral with the glass workpiece. Thereby, the marking has substantially the same characteristics to the ambient as the workpiece itself.

As disclosed in the above-cited patent to P. M. Heyman et al., the glass workpiece may carry only a single coating without an undercoating. In such case, it is preferred that the single coating contains white or light-colored light-reflective pigment particles. A machine-readable marking can be produced in a single coating by abrasion or ablation, as with the double coatings mentioned above, entirely through the coating, exposing the bare glass below, which is generally transmissive (non-reflective) of the light used by a machine-reader and therefore contrasts with a light-reflective coating. The markings may be read by detecting the differences in reflectivity between the marks of the marking and the surfaces therebetween in the specular angle, as disclosed in the above-cited Heyman et al. patent.

What is claimed is:

1. A workpiece comprising a glass main body and a machine-readable marking on a portion of said body, said body and said marking being resistant to temperatures in the range of about 400° to 450° C. said marking and the surrounding surface thereof having substantially different light reflectances, and a transparent overcoating over said marking, said overcoating consisting essentially of an unbroken nontacky film of an ultraviolet-cured, organic, polymeric material, said overcoating being substantially completely gasifiable by heating in air at temperatures in the range of about 300° to 450° C., said overcoating being resistant to processes which may deposit extraneous material on said marking, which material may interfere with the machine readability of said marking.

2. The workpiece defined in claim 1 wherein said main body comprises glass and said marking comprises a recessed coating consisting essentially of inorganic pigment particles and an inorganic binder.

3. The workpiece defined in claim 2 including an undercoating between and in direct contact with said body and said coating, said coating and said undercoating having substantially different light reflectances.

* * * * *